(12) United States Patent
McBride (10) Patent No.: US 7,065,052 B1
(45) Date of Patent: Jun. 20, 2006

(54) CELL STREAM REPLICATING DEVICE

(75) Inventor: Brian E. McBride, Kanata (CA)

(73) Assignee: Alcatel Canada Inc., Kanata (CA)

( * ) Notice: Subject to any disclaimer, the term of this patent is extended or adjusted under 35 U.S.C. 154(b) by 0 days.

(21) Appl. No.: 09/261,197

(22) Filed: Mar. 3, 1999

(30) Foreign Application Priority Data

Jul. 22, 1998 (CA) .................................... 2243680

(51) Int. Cl.
*H04L 1/00* (2006.01)
(52) U.S. Cl. ...................... 370/252; 370/432; 370/516; 375/371
(58) Field of Classification Search ................ 370/250, 370/252, 241.1, 395, 516, 390, 438, 230, 370/432; 375/368, 371
See application file for complete search history.

(56) References Cited

U.S. PATENT DOCUMENTS

| | | | | |
|---|---|---|---|---|
| 3,842,532 A | * | 10/1974 | Cote | 455/504 |
| 5,119,368 A | * | 6/1992 | Hiltner et al. | 370/376 |
| 5,313,453 A | * | 5/1994 | Uchida et al. | 370/248 |
| 5,345,426 A | * | 9/1994 | Lipschutz | 367/103 |
| 5,392,314 A | * | 2/1995 | Wolf | 375/224 |
| 5,502,749 A | * | 3/1996 | Ozaki | 375/368 |
| 5,576,873 A | * | 11/1996 | Crossland et al. | 359/117 |
| 5,742,907 A | * | 4/1998 | Brown | 455/503 |
| 5,875,177 A | * | 2/1999 | Uriu et al. | 370/244 |
| 5,905,718 A | * | 5/1999 | Kurokami et al. | 370/328 |
| 5,991,270 A | * | 11/1999 | Zwan et al. | 370/249 |
| 6,134,219 A | * | 10/2000 | Sato | 370/244 |
| 6,246,704 B1 | * | 6/2001 | So | 370/532 |
| 6,247,158 B1 | * | 6/2001 | Smallcomb | 714/786 |
| 6,307,869 B1 | * | 10/2001 | Pawelski | 370/516 |

OTHER PUBLICATIONS

R. Jain and G. Babic, "Performance Testing Effort at the ATM Forum: An Overview", IEEE Communications Magazine, Aug. 1997, p. 110.

\* cited by examiner

*Primary Examiner*—Steven Nguyen
*Assistant Examiner*—Robert Shand
(74) *Attorney, Agent, or Firm*—McCarthy Tetrault LLP (57) ABSTRACT

The digital data stream (e.g. ATM cell stream) replicating device features an input port for receiving a continuous digital data stream at an input transmission rate; a broadcast mechanism for replicating the input digital data stream N times; N output ports for transmitting each such replicated digital data stream through a separate output port at an output transmission rate at least equal to the input transmission rate; and a delay mechanism for introducing a relative delay for each said output digital data stream with respect to the input digital data stream such that the output streams are identical but out of phase with one another. Use of such a device enables a multi-port digital data communications device such as an ATM network switch to be tested using only one (expensive) performance test generator while still respecting the statistical multiplexing advantages of the multi-port digital data communications device.

44 Claims, 5 Drawing Sheets

CELL STREAM REPLICATING DEVICE

FIELD OF INVENTION

The invention generally relates to testing equipment for digital data communication devices, and more particularly to a device which generates a plurality of data traffic streams based on a single traffic stream.

BACKGROUND OF INVENTION

Testing of packet/cell based data communication devices, such as asynchronous transfer mode (ATM) based network nodes, is becoming more important as data communication technologies mature. This is because the majority of data communications devices implement standard protocols, and thus their functionality is more or less equivalent. Hence, a distinguishing factor between such devices is their performance under known, real world conditions, which customers often examine in order to base their purchase decisions. The desire for performance testing requirements can be seen in the standards setting bodies and industry associations such as the International Telecommunications Union (ITU), the Internet Engineering Task Force (IETF) and the ATM Forum, where numerous performance testing specifications are currently in the process of being drafted.

Performance testing requires the use of standardized traffic patterns on all input ports to a data communication device so that different devices may be tested under the same traffic conditions. Unfortunately, the costs are enormous with the present practice of using a test generator for each port. The average per port cost of good ATM traffic pattern generator is quite high, so the cost to test a device having a large number of ports can be quite large. For example, some ATM switches have 92 ports thereby requiring 92 test generators at a cost of several millions of dollars in order to test the switch. Due to the large testing costs, customers do not test all ports at once and thus cannot obtain a true evaluation of the performance of a device for comparison against others.

Accordingly, there exists a need to carry out performance testing in data communication devices in a cost effective manner.

SUMMARY OF INVENTION

According to one aspect of the invention, there is provided a method of generating digital traffic for use in testing a multi-port communications device. This method comprises the steps of generating a reference pattern defining the digital traffic, such as provided by a known test generator; and generating a plurality of traffic streams from the reference pattern, whereby the plural traffic streams are used for loading respective input ports of the communications device. In the preferred embodiment, respective phase delays are introduced between the plural traffic streams in order to mimic real world conditions on the input ports of the communications device using only one test generator whilst respecting any statistical multiplexing advantages provided the device.

According to another aspect of the invention, there is provided a method of loading a multi-port communications device with digital traffic. This method comprises the steps of: generating the digital traffic; and providing plural streams of the generated digital traffic to respective input ports of the communications device with phase delays.

According to another aspect of the invention, there is provided a method of loading a multi-port communications device with digital traffic. This method comprises the steps of: generating a plurality of identical digital traffic streams; and providing the identical streams to respective input ports of the communications device with phase delays.

According to another aspect of the invention, a digital data stream replicating device is provided comprising an input port for receiving a continuous digital data stream at an input transmission rate; broadcast means for replicating the input digital data stream N times; N output ports for transmitting each such replicated digital data stream through a separate output port at an output transmission rate at least equal to the input transmission rate; and delay means for introducing a relative delay for each said output digital data stream with respect to the input digital data stream such that the output streams are similar to the input stream but out of phase with one another. Use of such a device makes it possible to test a multi-port digital data communications device such as an ATM network switch using only one performance test generator whilst respecting the statistical multiplexing advantages of the multi-port digital data communications device.

In the preferred embodiment, the replicating device includes means for introducing empty data blocks into the output digital data stream when the output transmission rate of the corresponding output port is greater than the input transmission rate.

In the preferred embodiment, the delay means comprises a memory and N first-in first-out logical buffers established therein. Each logical buffer is associated with a separate replicated digital data stream, wherein data blocks associated with each logical buffer are forwarded to the corresponding output port only when the logical buffer is full such that the relative delay encountered by the replicated cell stream corresponds to the length of the logical buffer. The delay means for each replicated output digital data stream may also include the output transmission rate of the corresponding output port, whereby the relative delay encountered by the replicated digital data stream corresponds to the transmission rate of the corresponding output port.

The above-mentioned logical buffers may be established by copying each input data block into different physical buffers organized in the memory. Alternatively, the logical buffers may be established by copying each input data block into one physical buffer and maintaining a separate pointer to the physical buffer for each logical buffer.

In the preferred embodiments, the input and output digital data streams are ATM cell streams.

According to another aspect of the invention, there is a method of generating digital traffic for use in testing a multi-port communication device. The method comprises the steps of: generating a reference digital traffic pattern; generating a plurality of traffic streams replicated from the reference digital traffic pattern, wherein the plurality of traffic streams are used for loading respective input ports of the communication device; and introducing a plurality of phase delays among the plurality of traffic streams when compared to the reference digital traffic pattern. Transmission of one traffic stream of the plurality of traffic streams has a phase delay determined from a length of a buffer associated with the one traffic stream, and traffic streams begins at a time between boundaries of time units of a transmission rate associated with the one traffic stream.

The phase delay may be determined from the length of the buffer and the transmission rate. The communication device may effect statistical multiplexing amongst the plurality of traffic streams. The plurality of traffic streams may be continuous digital data streams. The plurality of traffic streams may be ATM cell steams.

Another traffic stream of the plurality of traffic streams may have a second phase delay determined from a length of a second buffer associated with the another traffic stream and the transmission rate.

According to another aspect of the invention, there is a method of loading a multi-port communication device with digital traffic. The method comprises the steps of: generating a digital traffic pattern; and providing a plurality of streams replicated from the digital traffic pattern to input ports of the communication device. The plurality of streams has a plurality of phase delays therebetween. Transmission of at least one stream of the plurality of streams begins at a time between boundaries of time units of a transmission rate associated with the each of the digital traffic pattern, and have a phase delay determined by at least a length of a buffer associated with the at least one stream. The communication device may effect statistical multiplexing of the plurality of streams.

According to another aspect of the invention, there is provided a method of loading a multi-port communication device with digital traffic. The method comprises the steps of generating from a digital traffic stream with a plurality of digital traffic streams having identical data content thereto; and providing the plurality of digital traffic streams with a plurality of phase delays therebetween to input ports of the communication device. Each phase delay is related to a buffer length. The phase delay is determined from a ratio utilizing the length of the buffer associated with at least one of the plurality of traffic streams. Transmission of at least one of the plurality of digital traffic streams begins at a time between boundaries of time units of a transmission rate associated with the each of the digital traffic. The communication device may effect statistical multiplexing of the plurality of digital traffic streams.

According to another aspect of the invention, there is a method of operating a digital traffic replicating device for use in testing a multi-port communication device. The method comprises the steps of receiving an input digital traffic stream; and generating a plurality of output digital traffic streams from the input digital traffic stream. A phase delay is introduced to at least one stream of the plurality of output digital traffic streams. The phase delay is determined from a ratio utilizing a buffer length associated with at least one stream. Transmission of the at least one of the plurality of output digital traffic streams begins at a time between boundaries of time units of a transmission rate associated with the input digital traffic stream. The plurality of output digital traffic streams have traffic patterns that are replicas of the input digital traffic stream. The communication device may effect statistical multiplexing of the plurality of output digital traffic streams.

According to another aspect of the invention, there is an apparatus for generating digital traffic for use in testing a multi-port communication device. The apparatus comprises: a reference pattern generator generating a reference pattern defining a digital traffic pattern; a traffic stream replicating device generating a plurality of traffic streams replicated from the reference pattern; and a phase delay module providing respective phase delays among the plurality of traffic streams utilizing a series of buffers. Transmission of at least one traffic stream of the plurality of traffic streams is provided with a phase delay based on a length of a buffer of the buffers associated with the at least one traffic stream, and begins at a time between boundaries of time units of a transmission rate associated with the plurality of traffic streams. The plurality of traffic streams load respective input ports of the communication device.

The each phase delay may be determined from the length of the buffer and the transmission rate. The communication device may effect statistical multiplexing of the plurality of traffic streams. The plurality of traffic streams may be continuous digital data streams. The plurality of traffic streams may be ATM cell streams.

According to another aspect of the invention, there is an apparatus for loading a multi-port communication device with digital traffic. The apparatus comprises: a traffic generator generating input digital traffic; and a traffic manager providing a plurality of streams replicated from the input digital traffic to input ports of the communication device. One stream of the plurality of streams has a phase delay being determined from a length of a buffer associated with the one stream such that transmission of the one stream begins at a time between boundaries of time units of a transmission rate associated with the input digital stream.

The communication device may effects statistical multiplexing of the plurality of streams and the phase delay may determined from a ratio utilizing the length of the buffer associated with the each stream and the transmission rate.

According to another aspect of the invention, there is provided an apparatus for loading a multi-port communication device with digital traffic. The apparatus comprises: a traffic generating module generating from a digital traffic stream a plurality of digital traffic streams having identical data content thereto; and a traffic manager providing the plurality of digital traffic streams to input ports of the communication device with a phase delay introduced to at least one of the plurality of digital traffic streams being determined from a buffer length and a transmission rate associated with the at least one of the plurality of digital traffic streams. Transmission of the at least one of the plurality of digital traffic streams begins at a time between boundaries of time units of a transmission rate associated with the input digital traffic. The communication device may effect statistical multiplexing of the plurality of digital traffic streams.

According to another aspect of the invention, there is provided a digital data stream replicating device. The device comprises: an input port for receiving an input continuous digital data stream comprising input data blocks at an input transmission rate; a traffic replicator to replicate the input continuous digital data stream into N streams of replicated continuous digital data streams; N output ports for transmitting the plurality of replicated continuous digital data streams at output transmission rates, each output transmission rate at least equal to the input transmission rate; and a delay module providing a predetermined delay for each replicated continuous digital data stream of the plurality of replicated digital data streams with respect to the input continuous digital data stream. Transmission of at least one stream of the each replicated continuous digital data stream has a phase delay determined from a length of a buffer associated with at least one stream and begins at a time between boundaries of time units of a transmission rate associated with the input digital traffic.

The device may further include an idle block generator for introducing idle data blocks into a replicated continuous digital data stream of the plurality of replicated continuous digital data streams for transmission through an output port of the N output ports when an output transmission rate associated with the output port is greater than the input transmission rate.

The delay module may comprise: a memory having N first-in first-out (FIFO) logical buffers established therein, each logical buffer being associated with one digital data stream of the plurality of replicated continuous digital data streams. When a logical buffer of the N FIFO logical buffers is full, data blocks associated with the logical buffer are forwarded to an output port of the N output ports associated with the logical buffer.

The delay module comprises: a memory having N first-in first-out (FIFO) logical buffers established therein, each logical buffer being associated with one digital data stream of the plurality of replicated continuous digital data streams. When a logical buffer of the N FIFO logical buffers is full, data blocks associated with the logical buffer are forwarded to an output port of the N output ports associated the logical buffer, such that the delay provided to a digital data stream transmitted through the output port correlates to a length of the logical buffer and its associated transmission rate.

The delay module for each replicated continuous output digital data stream may forward data blocks associated with its logical buffer at the output transmission rate of the corresponding output port; and the delay provided to the replicated continuous digital data stream may correlate to a transmission rate of the corresponding output port.

Each of the logical buffers may be established by copying the input data blocks into a physical buffer organized in the memory, and each of the logical buffers may be corresponding to a different physical buffer. The logical buffers may be established by copying each input data block into one physical buffer and maintaining a separate pointer to the physical buffer for each logical buffer. The input and transmitted digital data streams may be ATM cell streams.

According to another aspect of the invention, there is provided a digital data stream replicating device for providing data traffic input patterns to a communication device. The device comprises: an input port for receiving a continuous digital data stream comprising input data blocks at an input transmission rate; a memory; N output ports, each having an output transmission rate at least equal to the input transmission rate; a traffic processor connected between the input port and the N output ports, providing N first-in first-out logical buffers in the memory and associating each of the input data blocks of the continuous digital data stream with each one of the N logical buffers so as to replicate the input data blocks thereacross, each logical buffer being associated with only one of the output ports; and a scheduler to forward data blocks associated with a given logical buffer through its corresponding output port when the given logical buffer is full. Transmission of the data blocks begins at a time between boundaries of time units of a transmission rate associated with the corresponding output port and a phase delay associated with the transmission of the data block is determined from at least a length of the logical buffer.

Each logical buffer may have a length selected to achieve a relative delay between the input digital data stream and an output digital data stream may be replicated by the logical buffer for its corresponding output port.

Each of the logical buffers may be established by copying the input data blocks into a physical buffer organized in the memory, and each of the logical buffers may correspond to a different physical buffer. The logical buffers may be established by copying each input data block into one physical buffer and maintaining a separate pointer to the physical buffer for each logical buffer. The input and output digital data streams may be ATM streams.

The device may further include an idle traffic generator for introducing empty data blocks into an output digital data stream replicated by the logical buffer for its corresponding output port when the output transmission rate of its corresponding output port is greater than the input transmission rate.

For each logical buffer, its length and the output transmission rate of its corresponding output port may be selected to achieve a relative delay between the input digital data stream and an output digital data stream may be replicated by the logical buffer for its corresponding output port. The input and output digital data streams may be ATM streams.

According to another aspect of the invention, there is provided a performance testing device. The device comprises: a traffic generator for generating a continuous digital data stream; an input port for receiving the continuous digital data stream at an input transmission rate; a broadcaster for replicating the input digital data stream N times; N output ports for transmitting each such replicated digital data stream through a separate output port at an output transmission rate at least equal to the input transmission rate; and a delay module for introducing a predetermined relative delay for each the transmitted digital data stream with respect to the input digital data stream. Transmission of at least one stream of the each the transmitted digital data stream begins at a time between boundaries of time units of a transmission rate associated with the each transmitted digital data stream and has a phase delay determined by at least a length of a buffer associated with the at least one stream.

In another aspect of the invention, there is provided a performance testing device. The device comprises: a traffic generator for generating a continuous digital data stream; an input port for receiving the continuous digital data stream comprising input data blocks at an input transmission rate; a memory; N output ports, each having an output transmission rate at least equal to the input transmission rate; a traffic processor connected between the input port and the N output ports providing N first-in first-out logical buffers in the memory and associating each of the input data blocks of the continuous digital data stream with each one of the N logical buffers so as to replicate the input data blocks thereacross, each logical buffer being associated with only one of the output ports; and a scheduler for forwarding data blocks associated with a given logical buffer through its corresponding output port when the given logical buffer is full. Transmission of the data blocks begins at a time between boundaries of time units of an output transmission rate associated with transmission of the data blocks, and the transmission has a phase delay determined by at least a length of the logical buffer.

According to another aspect of the invention, there is provided a performance testing device. The device comprises: a traffic generator for generating a continuous digital data stream; an input port for receiving the continuous digital data stream comprising input data blocks at an input transmission rate; a memory; N output ports, each having an output transmission rate at least equal to the input transmission rate; a traffic processor connected between the input port and the N output ports for establishing N first-in first-out logical buffers in the memory, and associating each of the input data blocks of the continuous digital data stream with each one of the N logical buffers so as to replicate the input data blocks thereacross, each logical buffer being associated with only one of the output ports; and a scheduler for forwarding data blocks associated with a given logical buffer through its corresponding output port when the given logical buffer is full. Transmission of the data blocks begins at a time between boundaries of time units of an output transmission rate associated with transmission of the data blocks. One of the N first-in first-out logical buffers is a given size and at least another of the N first-in first-out logical buffers is a different size than the given size.

The device may further include an idle block generator to introduce idle data blocks into an output digital data stream replicated by the logical buffer for its corresponding output port when the output transmission rate of its corresponding output port is greater than the input transmission rate.

BRIEF DESCRIPTION OF DRAWINGS

The foregoing and other aspects of the invention will become more apparent from the following description of the preferred embodiments thereof and the accompanying drawings which illustrate, by way of example, the principles of the invention. In the drawings.

DETAILED DESCRIPTION OF PREFERRED EMBODIMENTS

Figure 1:
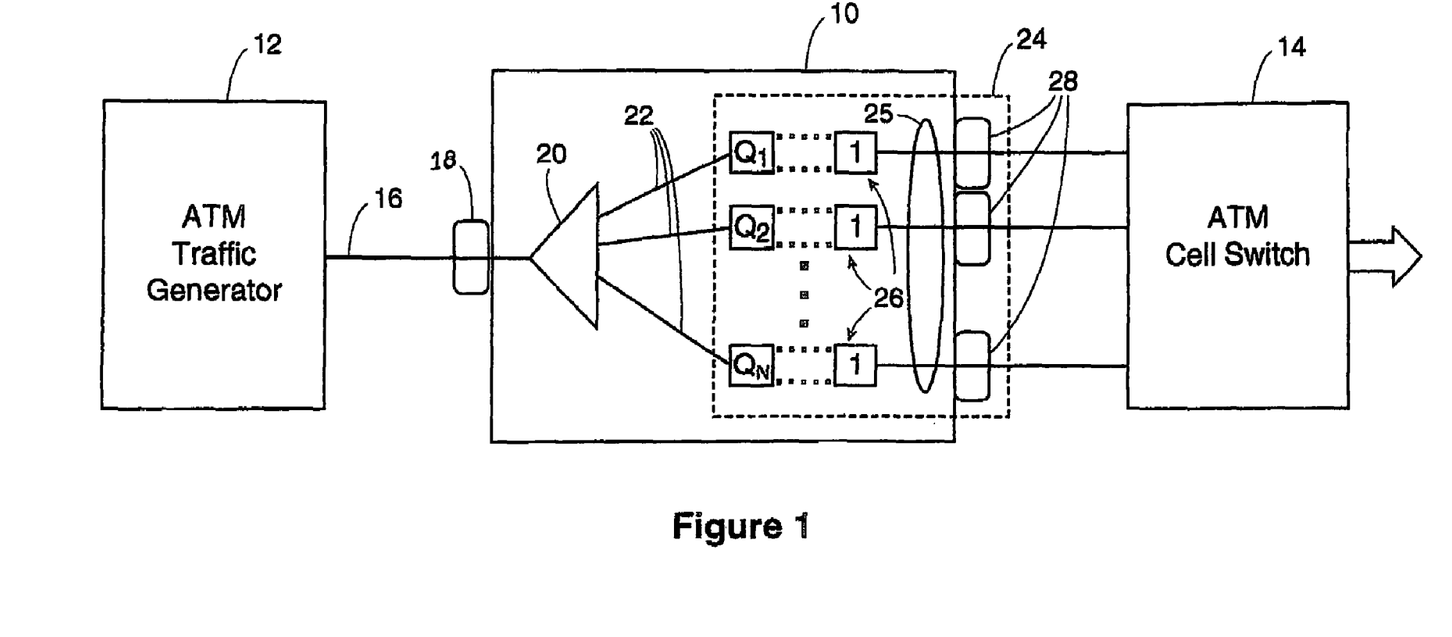
FIG. 1 is functional block diagram of a cell stream replicating device according to the preferred embodiment.

The functional block diagram of FIG. 1 illustrates a cell stream replicating device 10 according to the preferred embodiment which is connected between an ATM traffic generator 12 and a multiple input port ATM data communication device 14, such as an ATM cell switching device. The ATM traffic generator 12 produces an ATM cell stream, such as shown at ref. no. 54 in FIG. 2, on physical interface/line 16 (FIG. 1). The cell stream 54 carries a traffic pattern used for testing purposes such as performance testing. As noted from FIG. 2, the ATM cell stream 54 is "continuous" in the sense that even if there is no user information or data payload being carried by the cell stream at any given point in time (i.e. other than the ATM control information encapsulated in the cell header which is required for the functioning of the cell stream itself), the ATM traffic generator 12 generates idle or unassigned ATM cells 53 as known in the art, such that there are no gaps or discontinuities in the cell stream. Test generator 12 is commercially available from a variety of sources, including the Interwatch 95000 (trademark) model by GN Nettest and the AX4000 (trademark) model Adtech.

The cell stream replicating device 10 includes an input port 18 for receiving cell stream 54 on line 16 at the transmission rate thereof (Cell stream 54 is thus an input to the replicating device 10). A broadcast means 20 replicates cell stream 54 N times on N different outputs 22. A delay means 24 introduces a relative delay for each replicated cell stream with respect to cell stream 54. The device 10 also includes N output ports 28 for transmitting the N copies or replicas of cell stream 54, each through a separate output port, at an output transmission rate equal to the transmission rate of cell stream 54.

In the preferred embodiment, the delay means 24 comprises N logical first-in first-out (FIFO) buffers 26, as explained in greater detail below, in conjunction with a scheduling means 25. The broadcast means 20 associates or stores each cell of cell stream 54 with each of the logical FIFO buffers 26, as explained in greater detail below. Scheduling means 25 forwards the lead cell in a given logical buffer 26 to the corresponding output port 28 only when that logical buffer is full. Therefore, the relative delay encountered by each replicated cell stream on outputs 22 with respect to cell stream 54 on input line 16 corresponds to the length, in terms of the number of cells, of the corresponding logical buffer 26. More specifically, the average delay encountered by a given replicated cell stream is equal to:

$$\text{delay}_{avg} = \frac{1}{\text{Buffer Length} * \text{Output Transfer Rate}} \quad (1)$$

Figure 2:
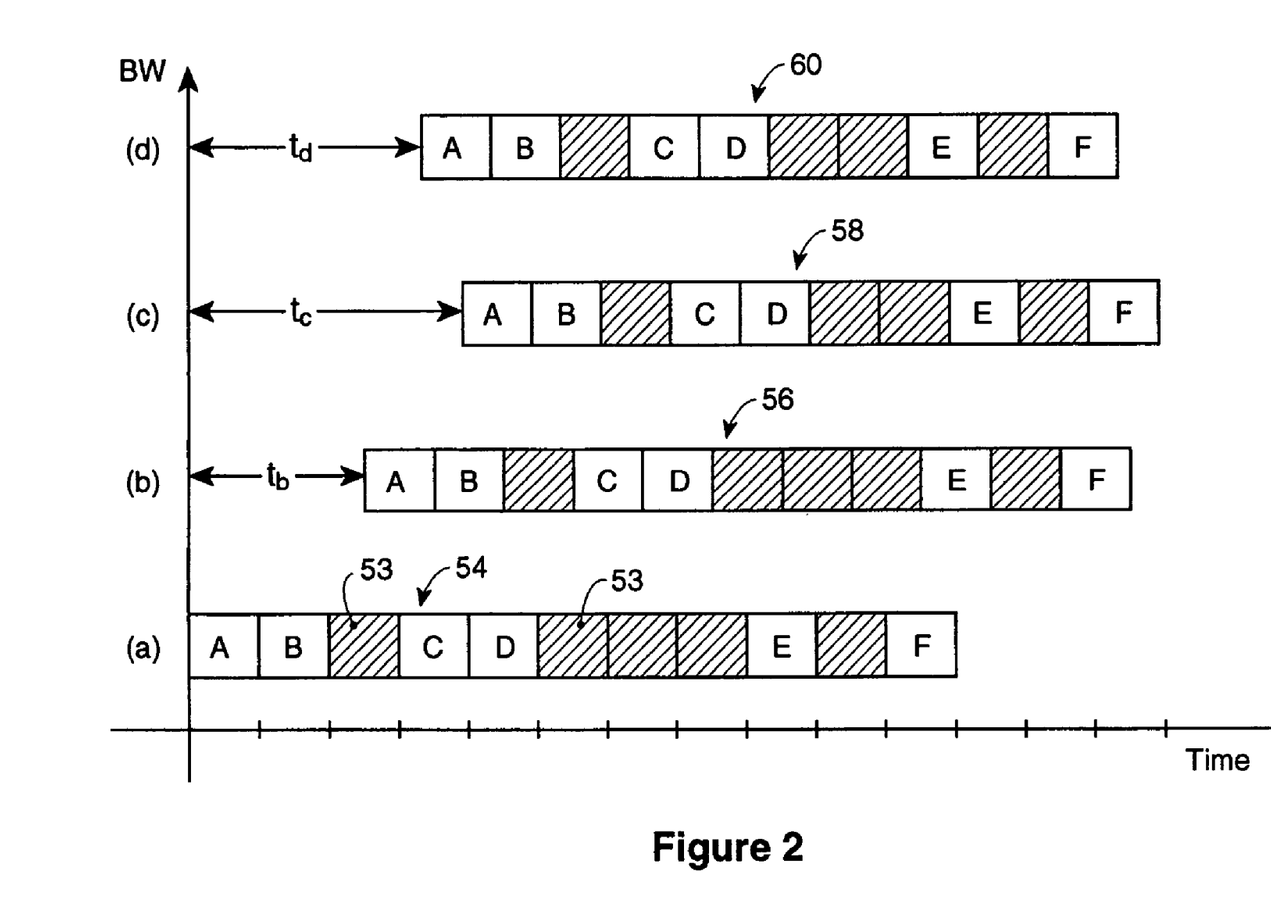
FIG. 2 is a timing diagram illustrating output cell streams which are delayed with respect to an input cell stream.

This is illustrated in the timing diagram of FIG. 2 where three (for example) replicated output streams, respectively designated by ref. nos. 56, 58 and 60, are shown. The delay means produces relative delays or phase delays $t_b$, $t_c$, and $t_d$ in the three replicated cell streams 56, 58 and 60 relative to cell stream 54, the magnitude of which are dependent upon the respective lengths of the corresponding logical buffers 26. It will thus be seen from FIG. 2 that the traffic pattern of each output cell stream is equivalent to the traffic pattern of cell stream 54; except for being out of phase with one another. This results in well defined traffic patterns on the N outputs 28, which do not occur simultaneously, thereby mimicking real world conditions on the N input ports of the ATM device 14 using only one traffic test generator 12. It will be appreciated that this phasing respects the statistical multiplexing advantages of ATM devices, as the test data traffic, in particular ATM cells associated with variable bit rate (VBR) service class virtual connections, arrive at the input ports of an ATM device in a more random fashion. Statistical multiplexing devices are designed to take advantage of burstiness and randomness behaviour of typical data traffic, and the introduction of respective delays in the multiple replicated test streams attempts to mimic this behaviour.

Referring to FIG. 2 and Equation (1), the embodiment provides a phase delay for a particular output data stream which is measured in time units which are finer in granularity than the granularity of time units of the transmission rate associated with that data stream. As such, a delayed data stream may begin to be transmitted at a time which is between cell transmission boundaries of an undelayed output data stream. For example, each of data streams $T_b$, $T_c$ and $T_d$ each has a delay which is measured in units which are finer, i.e. smaller, than the granularity in time units of the output data stream rate, as each data stream begins at a time which does not necessarily fall on the time unit boundaries of the output data stream rate, as indicated by the demarcations on the x-axis.

Figure 3A:
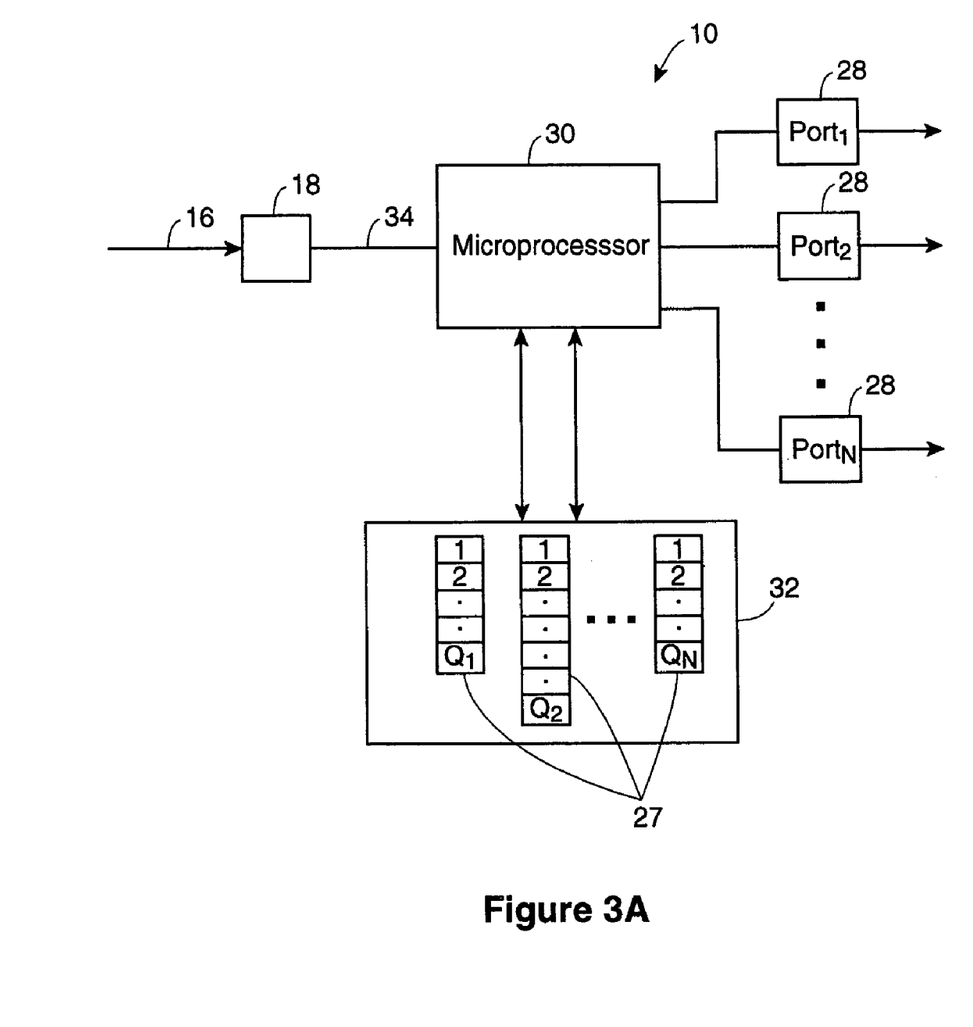
FIGS. 3A and 3B are system block diagrams of two implementations of the cell stream replicating device according to the preferred embodiment.

FIG. 3A is a system block diagram illustrating a first system for carrying out the preferred embodiment in practice. In this system, the cell stream replicating device 10 comprises a microprocessor 30 and an associated memory 32 which may be internal to (e.g., a high speed cache memory) or external of the microprocessor 30. The input port 18 is a serial port which converts a bit stream into corresponding word data readable by the microprocessor 30. The input port 18 is connected to the microprocessor 30 via an interrupt signal 34. The microprocessor is also connected to output ports 28 through various means well known in the art. In this case, the output ports 28 are serial ports which convert word data provided by the microprocessor 30 into a serial bit stream.

In the illustrated embodiment, memory 32 is organized into N physical FIFO buffers 27 such that each logical buffer 26 corresponds to one of the physical buffers 27. The microprocessor 30 implements the broadcast means 20, a portion of the delay means 24, and the scheduling means 25 by executing a program which, upon receipt of a new cell from the input port 18, copies the new cell to each physical buffer 27. The program also determines when any of the physical buffers 27 are full, and, for those buffers which are full, forwards the lead cells stored therein to the corresponding output ports 28. A housekeeping function of the program maintains each physical buffer by discarding cells which have been transmitted. For example, the physical buffers 27 may be constructed as linked lists, the lead elements of which are discarded when the data is forwarded to the output ports 28.

Figure 3B:
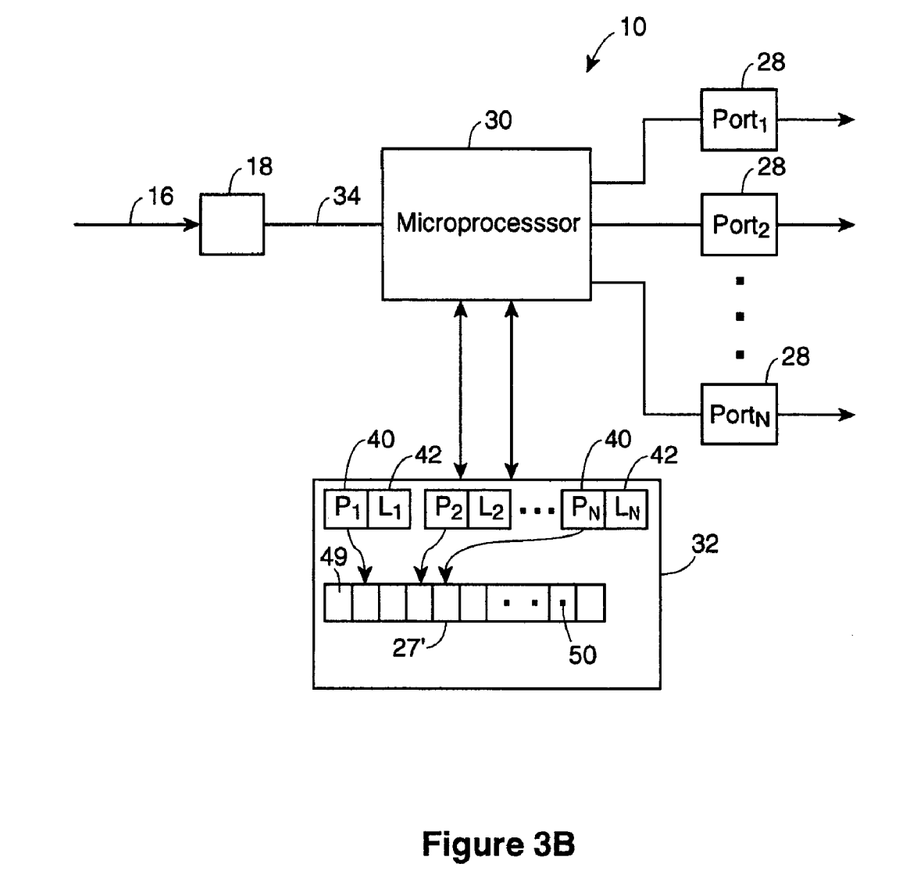

FIG. 3B illustrates a second system for carrying out the preferred embodiment in practice, which uses the same hardware shown in FIG. 3A. In this system, the memory 32 is organized so that there is only one physical buffer 27' into which all cells received from the input port 18 are stored. However, a program executing on the microprocessor 30 maintains a pointer 40 and buffer length register 42 in respect of each logical buffer 26 (i.e., there are N sets of registers 40 and 42). The pointer 40 associated with each logical buffer 26 may point to different cells stored in the physical buffer 27' as illustrated. In each case, the pointer 40 points to the first cell of the respective logical buffer. The program determines when each logical buffer 26 is full based on a comparison of the corresponding buffer length register 42 against the distance or length of the corresponding pointer 40 to the last cell 50 stored in the physical buffer 27. If the results of the comparison indicate that a given logical buffer 26 is full, the microprocessor 30 copies the cell pointed to by the corresponding pointer 40 to the corresponding output port 28. A housekeeping function of the program maintains the physical buffer 27' in order to add new cells received from the input port 18 and to delete cells which have already been transmitted to all of the output ports 28. For example, the physical buffer 27' may be constructed as a linked list data structure. In such a case, as illustrated for instance in FIG. 3B where all of the pointers 40 are pointing to a cell beyond a first cell 49 in the physical buffer 27', the housekeeping function recognizes that cells such as cell 49 have already been transmitted on all the output ports 28 and thus deletes such cells from the linked list. Further details regarding implementation of multiple logical buffers using a single physical buffer may be found, for instance, in U.S. Pat. No. 5,528,588 to Bennett et al., which is incorporated herein by reference.

Figure 4:
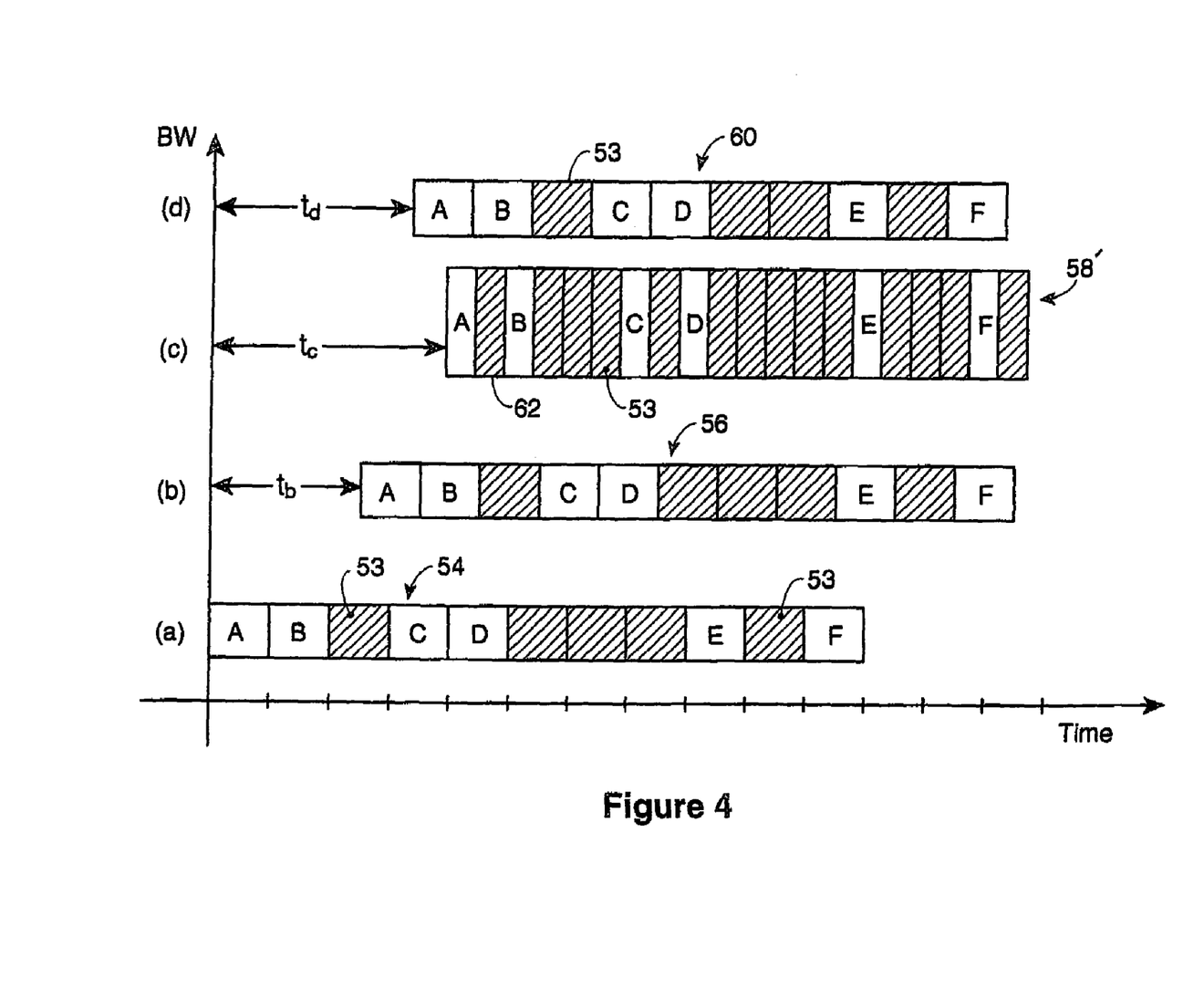
FIG. 4 is a timing diagram illustrating output cell streams which are delayed with respect to the input cell stream in situations where the output transmission rate is greater than the input transmission rate.

In the preferred embodiment the output ports 28 transmit data at a rate equal to the transmission rate of the input cell stream (line 16). However, it will be readily recognized from equation (1) that the average delay experienced by each replicated cell stream can also be varied by modifying the output transfer rate of the output port 28, provided the transmission rate of any given output port is greater then the transmission rate of (input) cell stream 54. In this embodiment, the output ports 28 are more sophisticated ATM segmentation and reassembly (SAR) devices. Such a device is capable of attaching header information to data destined for transport over an ATM link, and is capable of inserting idle or unassigned cells (i.e., cells not carrying any payload which are designed to be discarded by the receiving side) when there is no data to be transmitted. It will be appreciated that if the output ports 28 transmit at a rate greater than the transmission rate of (input) cell stream 54, it is necessary to insert idle cells in the output cell streams in order to perform a cell rate decoupling or speed matching function. An example of this phenomenon is shown in FIG. 4, where the vertical axis of the timing diagram represents the bandwidth or transmission rate of any given cell stream. In the illustrated example, replicated output cell stream 58' has a transmission rate, and hence bandwidth occupancy, which is twice that of cell stream 54. Thus, for instance, data payload A is transmitted in the replicated cell stream 58' in half the time that the data payload A is transmitted in cell stream 54. This necessitates the inclusion of an empty cell 62 between data payload A and the following adjacent data payload B in cell stream 58'.

In order to accommodate this function, the scheduling means 25 according to this alternative embodiment forwards the data payload of the ATM cells stored in the logical buffers 26 to the SAR interface devices which function as output ports 28 (as opposed to forwarding the entire ATM cell, inclusive of header, to the serial ports of the preferred embodiment). In addition, the modified scheduling means 25 sends the channel and other control information stored in the ATM cell headers (of cells associated with the logical buffers 26) separately to the SAR interface devices, in accordance with the particular interface protocols thereof.

The above-described embodiments of the invention have made reference to fixed length ATM cells and ATM cells streams. However, those skilled in the art will appreciate that the invention may be applied more generically to other types of continuous digital data streams including others which are formatted into discrete data blocks or packets, such as TDM and SONET. Furthermore, although the test traffic generation function and the traffic replicating function are implemented by separate entities in the above description, both of these functions may be provided within the same entity. Similarly, other modifications and variations may be made to the embodiments disclosed herein without departing from the spirit of the invention.

The invention claimed is:

1. A method of generating digital traffic for use in testing a multi-port communication device, said method comprising the steps of:
    generating a reference digital traffic pattern;
    generating a plurality of traffic streams replicated from the reference digital traffic pattern, wherein the plurality of traffic streams are used for loading respective input ports of the communication device; and
    introducing a plurality of phase delays among the plurality of traffic streams when compared to the reference digital traffic pattern, such that transmission of one traffic stream of said plurality of traffic streams has a phase delay determined from a length of a buffer associated with said one traffic stream and begins at a time between boundaries of time units of a transmission rate associated with said one traffic stream.

2. The method according to claim 1, wherein said phase delay is determined from said length of said buffer and said transmission rate.

3. The method according to claim 2, wherein another traffic stream of said plurality of traffic streams has a second phase delay determined from a length of a second buffer associated with said another traffic stream and said transmission rate.

4. The method according to claim 3 wherein the communication device effects statistical multiplexing amongst the plurality of traffic streams.

5. The method according to claim 4, wherein the plurality of traffic streams are continuous digital data streams.

6. The method according to claim 5, wherein the plurality of traffic streams are ATM cell streams.

7. A method of loading a multi-port communication device with digital traffic, the method comprising the steps of:
generating a digital traffic pattern; and
providing a plurality of streams replicated from the digital traffic pattern to input ports of the communication device, the plurality of streams having a plurality of phase delays therebetween, such that transmission of at least one stream of said plurality of streams begins at a time between boundaries of time units of a transmission rate associated with said each of said digital traffic pattern and has a phase delay determined by at least a length of a buffer associated with said at least one stream.

8. The method according to claim 7, wherein the communication device effects statistical multiplexing of the plurality of streams.

9. A method of loading a multi-port communication device with digital traffic, said method comprising the steps of:
generating from a digital traffic stream with a plurality of digital traffic steams having identical data content thereto; and
providing the plurality of digital traffic streams with a plurality of phase delays therebetween to input ports of the communication device, each phase delay being related to a buffer length, such that the phase delay is determined from a ratio utilizing the length of said buffer associated with at least one of said plurality of traffic streams, wherein transmission of at least one of said plurality of digital traffic streams begins at a time between boundaries of time units of a transmission rate associated with said each of said digital traffic.

10. The method according to claim 9, wherein the communication device effects statistical multiplexing of the plurality of digital traffic streams.

11. A method of operating a digital traffic replicating device for use in testing a multi-port communication device, comprising the steps of:
receiving an input digital traffic stream; and
generating a plurality of output digital traffic streams from the input digital traffic stream, wherein
a phase delay is introduced of at least one steam of the plurality of output digital traffic streams;
said phase delay is determined from a ratio utilizing a buffer length associated with at least one stream; transmission of said at least one of the plurality of output digital traffic streams begins at a time between boundaries of time units of a transmission rate associated with said input digital traffic stream; and
the plurality of output digital traffic streams have traffic patterns which are replicas of the input digital traffic stream; and 12. The method according to claim 11, wherein the communication device effects statistical multiplexing of the plurality of output digital traffic streams.

13. An apparatus for generating digital traffic for use in testing a multi-port communication device, said apparatus comprising:

a reference pattern generator generating a reference pattern defining a digital traffic pattern;
a traffic stream replicating device generating a plurality of traffic streams replicated from the reference pattern; and
a phase delay module providing respective phase delays among the plurality of traffic streams utilizing a series of buffers, such that transmission of at least one traffic stream of said plurality of traffic streams is provided with a phase delay based on a length of a buffer of said buffers associated with said at least one traffic stream and begins at a time between boundaries of time units of a transmission rate associated with said plurality of traffic streams, wherein the plurality of traffic streams load respective input ports of the communication device.

14. The apparatus for generating digital traffic for use in testing a multi-port communication device method as claimed in claim 13, wherein said each phase delay is determined from said length of said buffer and said transmission rate.

15. The apparatus according to claim 14, wherein the communication device effects statistical multiplexing of the plurality of traffic streams.

16. The apparatus according to claim 15, wherein the plurality of traffic streams are continuous digital data streams.

17. The apparatus according to claim 16, wherein the plurality of traffic streams are ATM cell streams.

18. An apparatus for loading a multi-port communication device with digital traffic, the apparatus comprising:
a traffic generator generating input digital traffic; and
a traffic manager providing a plurality of streams replicated from the input digital traffic to input ports of the communication device, one stream of the plurality of streams having a phase delay being determined from a length of a buffer associated with said one stream such that transmission of said one stream begins at a time between boundaries of time units of a transmission rate associated with said input digital stream.

19. The apparatus according to claim 18, wherein the communication device effects statistical multiplexing of the plurality of streams and said phase delay is determined from a ratio utilizing said length of said buffer associated with said each stream and said transmission rate.

20. Apparatus for loading a multi-port communication device with digital traffic, the apparatus comprising:
a traffic generating module generating from a digital traffic stream a plurality of digital traffic streams having identical data content thereto; and
a traffic manager providing the plurality of digital traffic streams to input ports of the communication device with a phase delay introduced to at least one of the plurality of digital traffic streams being determined from a buffer length and a transmission rate associated with said at least one of the plurality of digital traffic streams such that transmission of said at least one of the plurality of digital traffic streams begins at a time between boundaries of time units of a transmission rate associated with said input digital traffic.

21. The apparatus according to claim 20, wherein the communication device effects statistical multiplexing of the plurality of digital traffic streams.

22. A digital data stream replicating device, comprising:
an input port for receiving an input continuous digital data stream comprising input data blocks at an input transmission rate;

a traffic replicator to replicate broadcast means for replicating the input continuous digital data stream into N streams of replicated continuous digital data streams;

N output ports for transmitting the plurality of replicated continuous digital data streams at output transmission rates, each output transmission rate at least equal to the input transmission rate; and a delay module providing a predetermined delay for each replicated continuous digital data stream of the plurality of replicated digital data streams with respect to the input continuous digital data stream, such that transmission of at least one stream of said each replicated continuous digital data stream has a phase delay determined from a length of a buffer associated with at least one stream and begins at a time between boundaries of time units of a transmission rate associated with said input digital traffic.

23. The device according to claim 22, the device further including an idle block generator for introducing idle data blocks into a replicated continuous digital data stream of the plurality of replicated continuous digital data streams for transmission through an output port of the N output ports when an output transmission rate associated with the output port is greater than the input transmission rate.

24. The device according to claim 22, wherein the delay module comprises:

a memory having N first-in first-out (FIFO) logical buffers established therein, each logical buffer being associated with one digital data stream of the plurality of replicated continuous digital data streams, wherein when a logical buffer of the N FIFO logical buffers is full, data blocks associated with the logical buffer are forwarded to an output port of the N output ports associated with the logical buffer.

25. The device according to claim 23, wherein the delay module comprises:

a memory having N first-in first-out (FIFO) logical buffers established therein, each logical buffer being associated with one digital data stream of the plurality of replicated continuous digital data streams, wherein when a logical buffer of the N FIFO logical buffers is full, data blocks associated with the logical buffer are forwarded to an output port of the N output ports associated the logical buffer, such that said delay provided to a digital data stream transmitted through the output port correlates to a length of the logical buffer and its associated transmission rate.

26. The device according to claim 25, wherein:

the delay module for each replicated continuous output digital data stream forwards data blocks associated with its logical buffer at the output transmission rate of the corresponding output port; and the delay provided to the replicated continuous digital data stream correlates to a transmission rate of the corresponding output port.

27. The device according to claim 24, wherein each of the logical buffers is established by copying the input data blocks into a physical buffer organized in the memory, each of the logical buffers corresponding to a different physical buffer.

28. The device according to claim 26, each of the logical buffers is established by copying the input data blocks into a physical buffer organized in the memory, each of the logical buffers corresponding to a different physical buffer.

29. The device according to claim 24, wherein the logical buffers are established by copying each input data block into one physical buffer and maintaining a separate pointer to the physical buffer for each logical buffer.

30. The device according to claim 26, wherein the logical buffers are established by copying each input data block into one physical buffer and maintaining a separate pointer to the physical buffer for each logical buffer.

31. The device according to claim 24, wherein the input and transmitted digital data streams are ATM cell streams.

32. The device according to claim 26, wherein the input and transmitted digital data streams are ATM cell streams.

33. A digital data stream replicating device for providing data traffic input patterns to a communication device, comprising:

an input port for receiving a continuous digital data stream comprising input data blocks at an input transmission rate;

a memory;

N output ports, each having an output transmission rate at least equal to the input transmission rate;

a traffic processor connected between the input port and the N output ports, for providing N first-in first-out logical buffers in the memory and associating each of the input data blocks of the continuous digital data stream with each one of the N logical buffers so as to replicate the input data blocks thereacross, each logical buffer being associated with only one of the output ports; and a scheduler to forward data blocks associated with a given logical buffer through its corresponding output port when the given logical buffer is full, such that transmission of said data blocks begins at a time between boundaries of time units of a transmission rate associated with said corresponding output port and a phase delay associated with said transmission of said data blocks is determined from at least a length of said logical buffer.

34. The device according to claim 33, wherein each logical buffer has a length selected to achieve a relative delay between the input digital data stream and an output digital data stream replicated by the logical buffer for its corresponding output port.

35. The device according to claim 34, wherein each of the logical buffers is established by copying the input data blocks into a physical buffer organized in the memory, each of the logical buffers corresponding to a different physical buffer.

36. The device according to claim 34, wherein the logical buffers are established by copying each input data block into one physical buffer and maintaining a separate pointer to the physical buffer for each logical buffer.

37. The device according to claim 34, wherein the input and output digital data streams are ATM streams.

38. The device according to claim 33, the device further including an idle traffic generator for introducing empty data blocks into an output digital data stream replicated by the logical buffer for its corresponding output port when the output transmission rate of its corresponding output port is greater than the input transmission rate.

39. The device according to claim 38, wherein, for each logical buffer, its length and the output transmission rate of its corresponding output port are selected to achieve a relative delay between the input digital data stream and an output digital data stream replicated by the logical buffer for its corresponding output port.

40. The device according to claim 38, wherein the input and output digital data streams are ATM streams.

41. A performance testing device, comprising:
a traffic generator for generating a continuous digital data stream;
an input port for receiving the continuous digital data stream at an input transmission rate;
a broadcaster for replicating the input digital data stream N times;
N output ports for transmitting each such replicated digital data stream through a separate output port at an output transmission rate at least equal to the input transmission rate; and
a delay module for introducing a predetermined relative delay for each said transmitted digital data stream with respect to the input digital data stream, such that transmission of at least one stream of said each said transmitted digital data stream begins at a time between boundaries of time units of a transmission rate associated with said each transmitted digital data stream and has a phase delay determined by at least a length of a buffer associated with said at least one stream.

42. A performance testing device, comprising:
a the generator for generating a continuous digital data stream;
an input port for receiving the continuous digital data stream comprising input data blocks at an input transmission rate;
a memory;
N output ports, each having an output transmission rate at least equal to the input transmission rate;
a traffic processor connected between the input port and the N output ports, providing N first-in first-out logical buffers in the memory and associating each of the input data blocks of the continuous digital data stream with each one of the N logical buffers so as to replicate the input data blocks thereacross, each logical buffer being associated with only one of the output ports; and
a scheduler for forwarding data blocks associated with a given logical buffer through its corresponding output port when the given logical buffer is full, such that transmission of said data blocks begins at a time between boundaries of time units of an output transmission rate associated with transmission of said data blocks and said transmission has a phase delay determined by at least a length of said logical buffer.

43. A performance testing device, comprising:
a traffic generator for generating a continuous digital data stream;
an input port for receiving the continuous digital data stream comprising input data blocks at an input transmission rate;
a memory;
N output ports, each having an output transmission rate at least equal to the input transmission rate;
a traffic processor connected between the input port and the N output ports for establishing N first-in first-out logical buffers in the memory and associating each of the input data blocks of the continuous digital data stream with each one of the N logical buffers so as to replicate the input data blocks thereacross, each logical buffer being associated with only one of the output ports; and
a scheduler for forwarding data blocks associated with a given logical buffer through its corresponding output port when the given logical buffer is full such that transmission of said data blocks begins at a time between boundaries of time units of an output transmission rate associated with transmission of said data blocks
wherein one of said N first-in first-out logical buffers is a given size and at least another of said N first-in first-out logical buffers is a different size than said given size.

44. The device according to claim 43, the device further including an idle block generator to introduce idle data blocks into an output digital data steam replicated by the logical buffer for its corresponding output port when the output transmission rate of its corresponding output port is greater than the input transmission rate.

* * * * *

UNITED STATES PATENT AND TRADEMARK OFFICE
CERTIFICATE OF CORRECTION

| | |
|---|---|
| PATENT NO. | : 7,065,052 B1 |
| APPLICATION NO. | : 09/261197 |
| DATED | : June 20, 2006 |
| INVENTOR(S) | : Brian E. McBride |

It is certified that error appears in the above-identified patent and that said Letters Patent is hereby corrected as shown below:

Col. 11, line 61 replace the word "; and" with --.--.

Signed and Sealed this

Twenty-seventh Day of March, 2007

JON W. DUDAS
*Director of the United States Patent and Trademark Office*